US012592559B2

(12) United States Patent (10) Patent No.: US 12,592,559 B2
Korolev et al. (45) Date of Patent: Mar. 31, 2026

(54) FIELD DEVICE CURRENT LIMITING

(71) Applicant: Rosemount Inc., Shakopee, MN (US)

(72) Inventors: Yevgeny Yurevich Korolev, Maple Grove, MN (US); William Michael Mansfield, Niwot, CO (US); Xiong Gao, Gothenburg (SE)

(73) Assignee: ROSEMOUNT INC., Shakopee, MN (US)

( * ) Notice: Subject to any disclaimer, the term of this patent is extended or adjusted under 35 U.S.C. 154(b) by 368 days.

(21) Appl. No.: 18/084,068

(22) Filed: Dec. 19, 2022

(65) Prior Publication Data

US 2024/0204510 A1 Jun. 20, 2024

(51) Int. Cl.
*H02H 9/02* (2006.01)

(52) U.S. Cl.
CPC ..................................... *H02H 9/02* (2013.01)

(58) Field of Classification Search
CPC ............ H02H 9/04; H02H 9/02; H02H 9/025; H02H 9/046; H02H 9/008; H02H 9/00
USPC .......................................... 361/18, 93.7–93.9
See application file for complete search history.

(56) References Cited

U.S. PATENT DOCUMENTS

| | | | |
|---|---|---|---|
| 1,860,904 | A | 5/1932 | Remington |
| 1,981,545 | A | 11/1934 | Hammerling |
| 2,855,579 | A | 10/1958 | Wintriss |
| 2,955,352 | A | 10/1960 | Wintriss |
| 3,696,364 | A | 10/1972 | Lavelle |
| 3,706,957 | A | 12/1972 | Iantorno |
| 3,737,609 | A | 6/1973 | Overkott |
| 4,804,958 | A | 2/1989 | Longsdorf |
| 4,841,777 | A | 6/1989 | Hershey et al. |
| 5,193,846 | A | 3/1993 | Allard |
| 5,436,788 | A | 7/1995 | Wallaert |
| 5,554,809 | A | 9/1996 | Tobita et al. |
| 5,656,782 | A | 8/1997 | Powell, II et al. |
| 5,798,910 | A | 8/1998 | Holbeche et al. |

(Continued)

FOREIGN PATENT DOCUMENTS

| | | |
|---|---|---|
| CN | 1375110 A | 10/2002 |
| CN | 1914701 A | 2/2007 |

(Continued)

OTHER PUBLICATIONS

Notification of Transmittal of the International Search Report and the Written Opinion of the International Searching Authority from PCT/US2023/083050, dated Mar. 26, 2024.

(Continued)

*Primary Examiner* — Danny Nguyen
(74) *Attorney, Agent, or Firm* — Westman, Champlin & Koehler, P.A.

(57) ABSTRACT

A current limiting circuit for limiting a current through a pair of terminals powered from a 2-wire Advanced Physical Layer (APL) spur includes a current source, a first current limiter and a second current limiter. The current source is connected to one of the terminals and is configured to source a current that is conducted through the terminals and has an amplitude that is at a current source threshold. The first current limiter is connected to the current source and is configured to limit the amplitude below a first threshold. The second current limiter is connected to the first current limiter and is configured to limit the amplitude below a second threshold.

18 Claims, 7 Drawing Sheets

(56) References Cited

U.S. PATENT DOCUMENTS

| | | |
|---|---|---|
| 5,937,758 A | 8/1999 | Maracas et al. |
| 6,047,220 A | 4/2000 | Eryurek |
| 6,050,145 A | 4/2000 | Olson et al. |
| 6,382,448 B1 | 5/2002 | Yuhara et al. |
| 6,422,532 B1 | 7/2002 | Garner |
| 6,457,367 B1 | 10/2002 | Behm et al. |
| 6,487,912 B1 | 12/2002 | Behm et al. |
| 6,568,266 B1 | 5/2003 | Desa et al. |
| 6,813,132 B1 | 11/2004 | Mitlmeier et al. |
| 7,035,773 B2 | 4/2006 | Keyes, IV et al. |
| 7,447,612 B2 | 11/2008 | Keyes, IV et al. |
| 7,458,275 B2 | 12/2008 | Kleven et al. |
| 7,848,906 B2 | 12/2010 | Keyes, IV et al. |
| 7,956,738 B2 | 6/2011 | Karschnia et al. |
| 8,049,361 B2 | 11/2011 | Kielb et al. |
| 8,145,180 B2 | 3/2012 | Brown et al. |
| 8,160,535 B2 | 4/2012 | Kielb et al. |
| 8,299,938 B2 | 10/2012 | Hedtke |
| 8,334,788 B2 | 12/2012 | Hausler et al. |
| 8,355,234 B2 | 1/2013 | Nilman-Johansson et al. |
| 8,538,560 B2 | 9/2013 | Brown et al. |
| 8,538,732 B2 | 9/2013 | Keyes, IV et al. |
| 8,626,087 B2 | 1/2014 | Vanderaa |
| 8,694,060 B2 | 4/2014 | Vanderaa et al. |
| 8,776,608 B2 | 7/2014 | Hedtke et al. |
| 8,787,848 B2 | 7/2014 | Kielb et al. |
| 8,847,571 B2 | 9/2014 | Kielb |
| 8,929,948 B2 | 1/2015 | Vanderaa et al. |
| 9,089,049 B2 | 7/2015 | Perrault et al. |
| 9,117,609 B2 | 8/2015 | Kodama |
| 9,159,512 B2 | 10/2015 | Kodama et al. |
| 9,261,385 B2 | 2/2016 | Loeffel et al. |
| 9,473,050 B2 | 10/2016 | Park |
| 9,674,976 B2 | 6/2017 | Strei et al. |
| 9,971,316 B2 | 5/2018 | Jia et al. |
| 10,102,985 B1 | 10/2018 | Pelletier et al. |
| 10,217,573 B2 | 2/2019 | Glosser et al. |
| 10,701,820 B1 | 6/2020 | Jacobs et al. |
| 10,915,084 B2 | 2/2021 | Wienhold et al. |
| 11,513,018 B2 | 11/2022 | Holm et al. |
| 12,218,775 B2 | 2/2025 | Schnaare et al. |
| 2002/0149371 A1 | 10/2002 | Grassmann |
| 2003/0085200 A1 | 5/2003 | Rosenkrans et al. |
| 2003/0171827 A1 | 9/2003 | Keyes, IV et al. |
| 2004/0047114 A1 | 3/2004 | Turner et al. |
| 2005/0168891 A1 | 8/2005 | Nilman-Johansson et al. |
| 2006/0142875 A1 | 6/2006 | Keyes, IV et al. |
| 2006/0274493 A1 | 12/2006 | Richardson et al. |
| 2008/0157235 A1 | 7/2008 | Rogers et al. |
| 2009/0062931 A1 | 3/2009 | Keyes, IV et al. |
| 2010/0181179 A1 | 7/2010 | Bou et al. |
| 2010/0258331 A1 | 10/2010 | Dahlgren et al. |
| 2011/0134973 A1 | 6/2011 | Keyes, IV et al. |
| 2012/0111596 A1 | 5/2012 | Mortun et al. |
| 2013/0325369 A1 | 12/2013 | Sofen et al. |
| 2013/0335174 A1 | 12/2013 | Kodama et al. |
| 2014/0002945 A1 | 1/2014 | Kodama |
| 2015/0002753 A1 | 1/2015 | Perrault et al. |
| 2015/0115863 A1 | 4/2015 | Park |
| 2015/0155111 A1 | 6/2015 | Kondrus |
| 2015/0208538 A1 | 7/2015 | Clarke et al. |
| 2015/0369684 A1 | 12/2015 | Nguyen et al. |
| 2016/0069765 A1 | 3/2016 | Ishikawa et al. |
| 2016/0092386 A1 | 3/2016 | Sakamoto |
| 2016/0109871 A1 | 4/2016 | Phillips |
| 2016/0241011 A1* | 8/2016 | Onishi ............... H03K 17/0828 |
| 2016/0377306 A1 | 12/2016 | Drees et al. |
| 2017/0178825 A1 | 6/2017 | Glosser et al. |
| 2018/0024195 A1 | 1/2018 | Takamura et al. |
| 2018/0070468 A1 | 3/2018 | Yanagisawa et al. |
| 2018/0275006 A1 | 9/2018 | Osawa et al. |
| 2018/0283972 A1 | 10/2018 | Osawa et al. |
| 2019/0029121 A1 | 1/2019 | Gaertner, II |
| 2019/0044325 A1* | 2/2019 | Wilson .................... H04L 43/16 |
| 2019/0066938 A1 | 2/2019 | Ishida et al. |
| 2019/0138995 A1 | 5/2019 | Currin et al. |
| 2019/0253544 A1 | 8/2019 | Hu et al. |
| 2019/0286965 A1 | 9/2019 | Lovell et al. |
| 2020/0063884 A1 | 2/2020 | Hurd |
| 2020/0103386 A1 | 4/2020 | Lindsey et al. |
| 2020/0371572 A1 | 11/2020 | Plank et al. |
| 2021/0081346 A1 | 3/2021 | Nixon et al. |
| 2021/0083472 A1 | 3/2021 | Graber et al. |
| 2021/0148778 A1 | 5/2021 | Stopel et al. |
| 2021/0157198 A1 | 5/2021 | Hu et al. |
| 2021/0226822 A1 | 7/2021 | Graber et al. |
| 2021/0356346 A1 | 11/2021 | Hidaka et al. |
| 2021/0360809 A1 | 11/2021 | Ahn et al. |
| 2022/0078252 A1 | 3/2022 | Nixon et al. |
| 2022/0319791 A1 | 10/2022 | Geppert et al. |
| 2023/0318875 A1* | 10/2023 | Swarr ................. G06F 13/4282 370/254 |
| 2023/0324871 A1 | 10/2023 | Strütt et al. |
| 2024/0056320 A1 | 2/2024 | Swarr et al. |
| 2024/0129145 A1 | 4/2024 | vom Stein |
| 2024/0205041 A1 | 6/2024 | Schnaare et al. |

FOREIGN PATENT DOCUMENTS

| | | |
|---|---|---|
| CN | 101718842 A | 6/2010 |
| CN | 102169162 A | 8/2011 |
| CN | 103443895 A | 12/2013 |
| CN | 104396138 A | 3/2015 |
| CN | 205533544 U | 8/2016 |
| CN | 106471595 A | 3/2017 |
| DE | 102020123409 A1 | 3/2022 |
| EP | 0 948 759 A1 | 10/1999 |
| EP | 2 063 278 A1 | 5/2009 |
| FR | 2167150 A5 | 8/1973 |
| GB | 1402740 A | 8/1975 |
| JP | H01-166425 A | 6/1989 |
| JP | H03-012808 A | 4/1992 |
| JP | H04-102127 | 4/1992 |
| JP | 2009-110546 A | 5/2009 |
| JP | 2012-199115 A | 10/2012 |
| WO | 2020120058 A1 | 6/2020 |
| WO | 2022182727 A1 | 9/2022 |
| WO | 2022182771 A1 | 9/2022 |
| WO | 2022182771 A4 | 10/2022 |

OTHER PUBLICATIONS

US Office Action from U.S. Appl. No. 18/084,057, dated May 23, 2024.

Communication Pursuant to Rules 161(1) and 162 EPC from European Patent Application No. 19705438.0, dated Oct. 20, 2020.

E-Direct Produktkatalog 2016-2017, Endress+Hauser, Part 1, Jan. 1, 2016, pp. 1-84.

E-Direct Produktkatalog 2016-2017, Endress+Hauser, Part 2, Jan. 1, 2016, pp. 85-168.

E-Direct Produktkatalog 2016-2017, Endress+Hauser, Part 3, Jan. 1, 2016, pp. 169-180.

Notification of Transmittal of the International Search Report and the Written Opinion of the International Searching Authority, from PCT/US2019/015556, dated Apr. 18, 2019.

Product Data Sheet, Rosemount 2120 Level Switch-Vibrating Fork, 00813-0100-04030, Rev. HC, Dec. 2017, 24 pgs.

U.S. Appl. No. 15/928,449, filed Mar. 22, 2018.

U.S. Patent Office issued prosecution for U.S. Appl. No. 15/918,226, filed Mar. 12, 2018, including:Corrected Notice of Allowability issued Dec. 1, 2020, 3 pages; Notice of Allowance and Fees Due (PTOL-85) issued Oct. 20, 2020, 8 pages; Final Rejection issued Jul. 28, 2020, 25 pages; Non-Final Rejection issued Mar. 4, 2020, 25 pages; Advisory Action, Examiner Initiated Interview Summary and AFCP Decision issued Nov. 29, 2019, 5 pages; Final Rejection issued Sep. 23, 2019, 24 pages; Non-Final Rejection issued May 16, 2019, 22 pages.

First Office Action, including Search Report, for Chinese Patent Application No. 201810667210.4, dated May 5, 2022, 13 pages.

Second Office Action, including Search Report, for Chinese Patent Application No. 201810667210.4, dated Aug. 26, 2022, 5 pages.

(56) References Cited

OTHER PUBLICATIONS

Communication Pursuant to Article 94(3) EPC from European Patent Application No. 19705438.0, dated Oct. 22, 2021.
Notice of Reasons for Rejection (Office Action) from Japanese Patent Application No. 2020-548912, dated Nov. 11, 2021.
Notification of Transmittal of the International Search Report and the Written Opinion of the International Searching Authority, from PCT/US2021/033067, dated Sep. 9, 2021.
U.S. Patent Office issued prosecution for U.S. Appl. No. 17/039,222, filed Sep. 30, 2020, including: Notice of Allowance and Fees Due (PTOL-85) and Examiner Initiated Interview Summary issued Jul. 25, 2022, 9 pages; Non-Final Rejection issued Apr. 8, 2022, 17 pages; 26 pages total.
U.S. Appl. No. 18/084,057, filed Dec. 19, 2022.
Notification of Transmittal of the International Search Report and the Written Opinion of the International Searching Authority from PCT/US2023/074338, dated Jan. 2, 2024.
Notification of Transmittal of the International Search Report and the Written Opinion of the International Searching Authority, from PCT/US2025/027729, dated Aug. 12, 2025.
Notification of Transmittal of the International Search Report and the Written Opinion of the International Searching Authority from PCT/US2025/019310, dated May 27, 2025.

* cited by examiner

FIELD DEVICE CURRENT LIMITING

FIELD DEVICE CURRENT LIMITING

Field

Embodiments of the present disclosure relate to industrial process control systems and field devices of such systems. More specifically, embodiments of the present disclosure relate to fault current limiting techniques for field devices powered through a 2-wire Advanced Physical Layer (APL) spur used in Ethernet-APL systems.

Background

In industrial settings, control systems are used to monitor and control inventories of industrial and chemical processes, and the like, using process measurement or control field devices. Such field devices may perform conventional field device tasks such as process parameter monitoring and measurements using one or more sensors (e.g., pressure sensor, level sensor, temperature sensor, etc.), and/or process control operations using one or more control devices (e.g., actuators, valves, etc.).

Ethernet-APL systems have been developed to improve field device data communications and safety. Such systems are responsible for the transmission and reception of data between a device (e.g., network interface controller, Ethernet hub, network switch, etc.) and a physical data communication link (e.g., data transmission cable). Ethernet-APL systems follow standards set by the Institute of Electrical and Electronics Engineers (IEEE) and the International Electrotechnical Commission (IEC), which allow for high speed data communications and the delivery of power and communications signals over a 2-wire connection while meeting certain intrinsic safety requirements.

Current field devices typically utilize a 4-20 milliamp (mA) process control loop for power and data communications with a remotely located control unit. Such devices implement non-ethernet communication protocols, such as HART®, Modbus, PROFIBUS, Foundation™ Fieldbus, IO-Link, and others.

Ethernet-APL devices must meet the 2-Wire Intrinsically Safe Ethernet (2-WISE) standard for operation in hazardous environments. However, the 2-WISE standard presents significant challenges for the electrical architecture of field devices since the intrinsic safety maximum input power or fault power is around five times higher than that allowed in certain legacy field devices (e.g., 4-20 mA/HART® and Foundation™ Fieldbus devices) that are configured for operation in hazardous environments.

SUMMARY

Embodiments of the present disclosure generally relate to a current limiting circuit for limiting a current through a pair of terminals that are powered from a 2-wire Advanced Physical Layer (APL) spur. Additional embodiments relate to a field device for an industrial process that includes the current limiting circuit, and a method of controlling a current in a field device using the current limiting circuit.

In one example, the current limiting circuit includes a current source, a first current limiter and a second current limiter. The current source is connected to one of the terminals and is configured to source a current that is conducted through the terminals and has an amplitude that is at a current source threshold. The first current limiter is connected to the current source and is configured to limit the amplitude below a first threshold. The second current limiter is connected to the first current limiter and is configured to limit the amplitude below a second threshold. In one embodiment, the first and second thresholds are greater than the current source threshold.

One embodiment of the field device includes a pair of terminals, field device circuitry and a current limiting circuit. The pair of terminals is configured to receive power from a 2-wire Advanced Physical Layer (APL) spur. The current limiting circuit includes a current source, a first current limiter and a second current limiter. The current source is connected to one of the terminals and is configured to source a current through the terminals that has an amplitude that is at a current source threshold. The first current limiter is connected to the current source and is configured to limit the amplitude below a first threshold. The second current limiter is connected to the first current limiter and is configured to limit the amplitude below a second threshold. The field device circuitry is connected to the second current limiter and is powered using the current.

In one example of a method of controlling a current in a field device, the field device includes a pair of terminals, field device circuitry and a current limiting circuit that includes a current source connected to one of the terminals, a first current limiter connected to the current source, and a second current limiter connected to the first current limiter and the field device circuitry. In one embodiment of the method power is received from a 2-wire Advanced Physical Layer (APL) spur at the pair of terminals. A current conducted through the terminals is sourced using the current source, which limits an amplitude of the current to a current source threshold. The current is received from the current source at the first current limiter, which limits the amplitude below a first threshold. The current is received from the first current limiter at the second current limiter, which limits the amplitude below a second threshold. The field device circuitry, which is connected to the second current limiter, is powered using the current.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
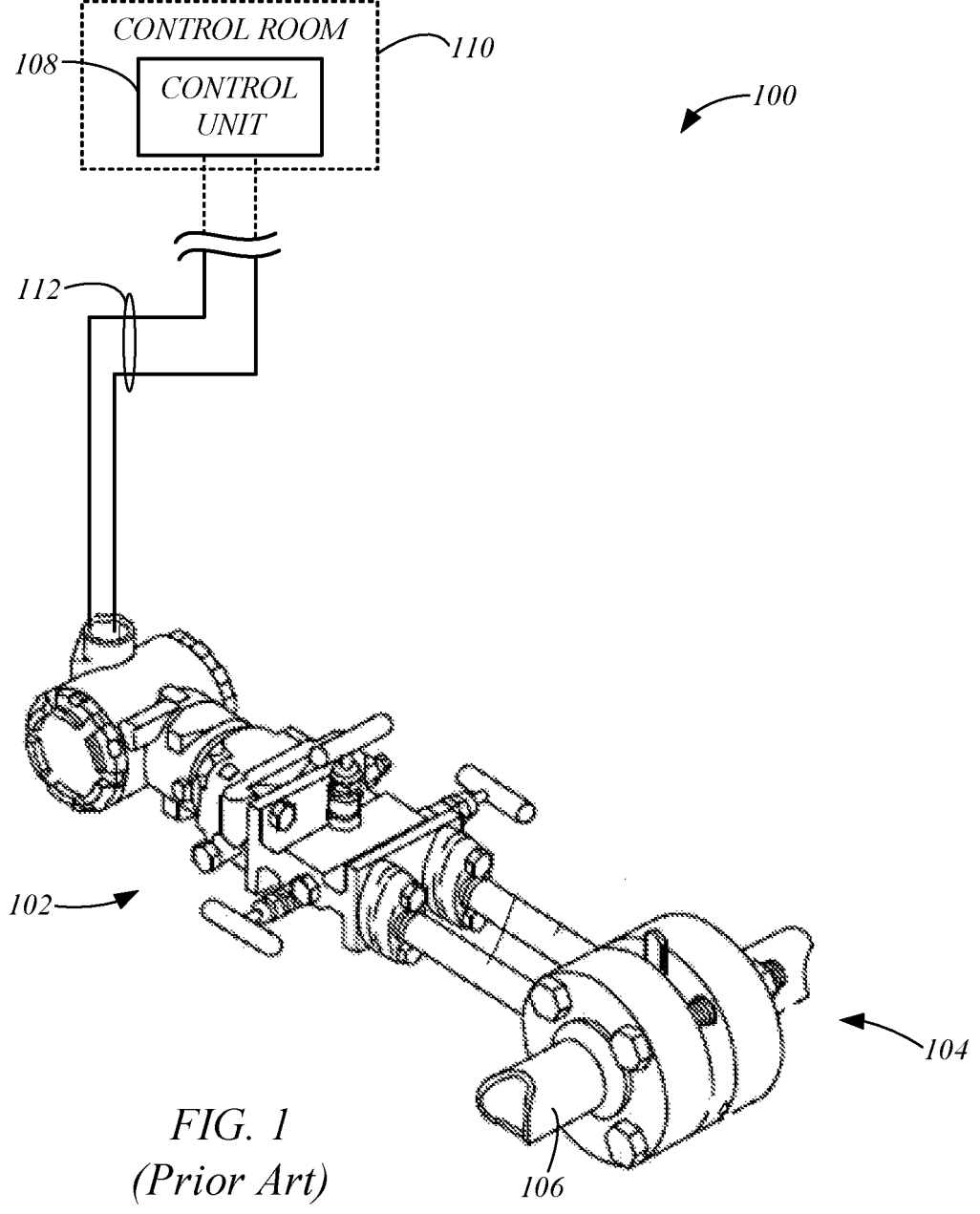
FIGS. 1 and 2 are simplified diagrams of examples of a process measurement or control system that includes an industrial process legacy field device, in accordance with the prior art.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Figure 2:
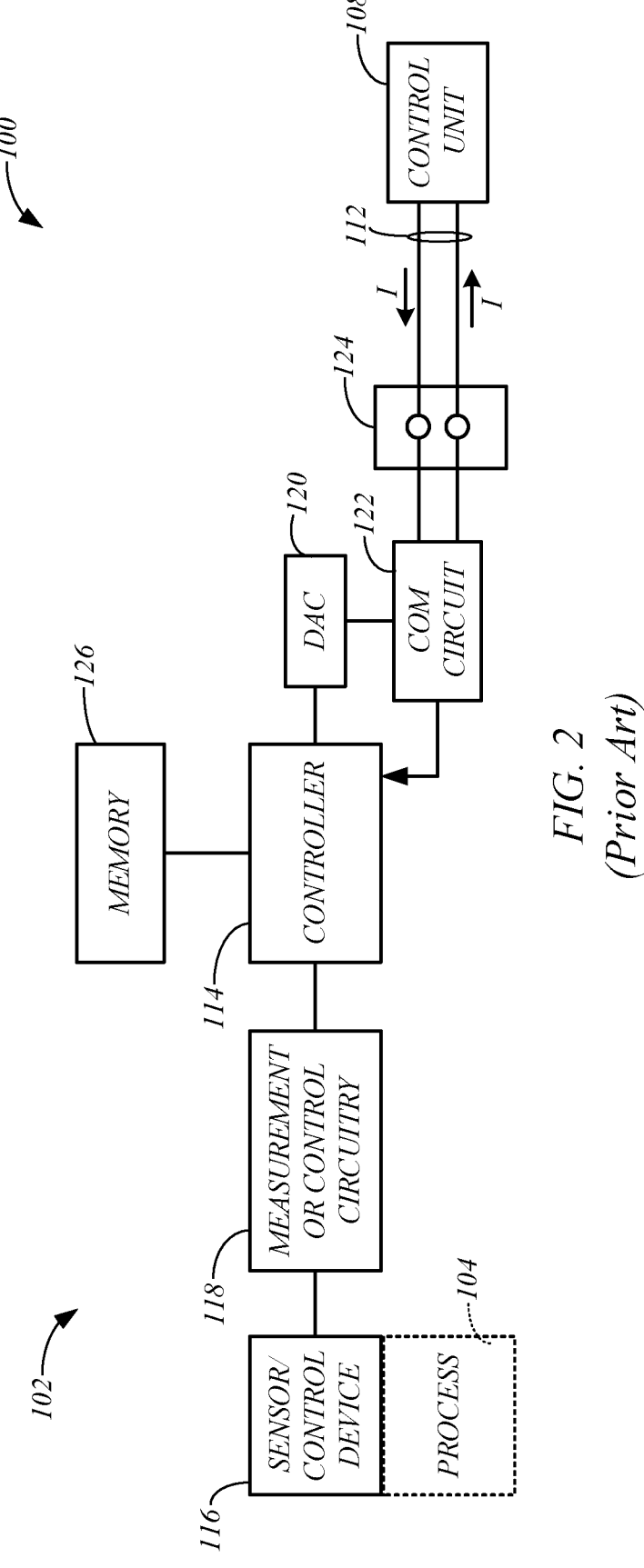

FIGS. 1 and 2 are simplified diagrams of an example of a process measurement or control system 100 that includes an industrial process legacy field device 102, in accordance with the prior art. The legacy field device 102 may interact with an industrial process 104. In some embodiments, the process 104 involves a material, such as a fluid, transported through pipes, such as pipe 106 (FIG. 1), and/or contained in tanks, for example. The system 100 may perform processes that transform the material from a less valuable state into more valuable and useful products, such as petroleum, chemicals, paper, food, etc. For example, an oil refinery performs industrial processes that can process crude oil into gasoline, fuel oil, and other petrochemicals.

The field device 102 communicates with a computerized control unit 108 that controls the field device 102. The control unit 108 may be remotely located from the field device 102, such as in a control room 110 for the system 100, as shown in FIG. 1.

The field device 102 may be coupled to the control unit 108 over a process control loop 112, such as a 2-wire 4-20 milliamp (mA) process control loop, which may power the field device 102. Additionally, communications between the control unit 108 and the field device 102 may be performed over the control loop 112 in accordance with analog and/or digital communication protocols used by legacy field devices 102. For example, a process variable may be represented by an analog signal, such as a level of a loop current I (FIG. 2) flowing through the process control loop 112. Legacy digital communication protocols, such as the HART® communication standard, generally modulate digital signals onto the analog current level of the 2-wire process control loop 112. Other examples legacy digital communication protocols that may be used include Modbus, PROFIBUS, Foundation™ Fieldbus, IO-Link, and other communication protocols. These communication protocols used by legacy field devices 102 do not include Ethernet communication protocols.

In some embodiments, the circuitry of the field device 102 includes a controller 114, an active component in the form of one or more sensors or control devices 116, measurement or control circuitry 118, a digital-to-analog converter (DAC) 120, a communications circuit 122, and/or a terminal block 124, as shown in the simplified diagram of FIG. 2. The controller 114 may represent one or more processors (i.e., microprocessor, central processing unit, etc.) that control components of the field device 102 to perform one or more functions described herein in response to the execution of instructions, which may be stored locally in non-transitory, patent subject matter eligible, computer readable media or memory 126 of the device 102. In some embodiments, the processors of the controller 114 are components of one or more computer-based systems. In some embodiments, the controller 114 includes one or more control circuits, microprocessor-based systems, one or more programmable hardware components, such as a field programmable gate array (FPGA), that are used to control components of the device 102 to perform one or more functions described herein. The controller 114 may also represent other conventional legacy field device circuitry.

The field device 102 may be used to sense or measure a parameter of the process 104, such as a temperature, a level, a pressure, a flow rate, or another parameter of the process 104 using one or more sensors represented by block 116 in FIG. 2. Exemplary sensors 116 include pressure sensors, temperature sensors, level sensors, flow rate sensors, and/or other sensors used to sense or measure a process parameter.

The field device 102 may also be configured to control an aspect of the process 104 using one or more control devices represented by block 116 in FIG. 2. Exemplary control devices 116 include actuators, solenoids, valves, and other conventional process control devices used in field devices to control a process.

The measurement or control circuitry 118 represents circuitry that interacts with the sensor or the control device 116. For instance, the circuitry 118 may include measurement circuitry that translates an output from a sensor 116 for use by the controller 114 of the field device 102. The DAC 120 may be used by the controller 114 to convert digital signals into analog signals that are communicated to the control unit 108 using the communications circuit 122, such as over the 2-wire process control loop 112 by adjusting the loop current I to indicate a value of a process parameter sensed by the sensor 116, for example. The circuitry 118 may also be used to control a control device 116, such as in response to commands from the control unit 108 that are received by the controller 114 through the communications circuit 122, for example.

Embodiments of the present disclosure relate to Advanced Physical Layer (APL) field devices that operate similarly to the legacy field device 102 (e.g., parameter measurement or device control), but are powered differently and are configured to communicate using Ethernet communication protocols. Such APL field devices provide significant improvements over their legacy counterparts by providing high power and high data communication bandwidth over 2-wire APL spur links. Some embodiments relate to current limiting circuit that may be used in an APL field device to limit an amplitude of a current flowing through the device and allow the device to meet certain intrinsic safety requirements.

Figure 3:
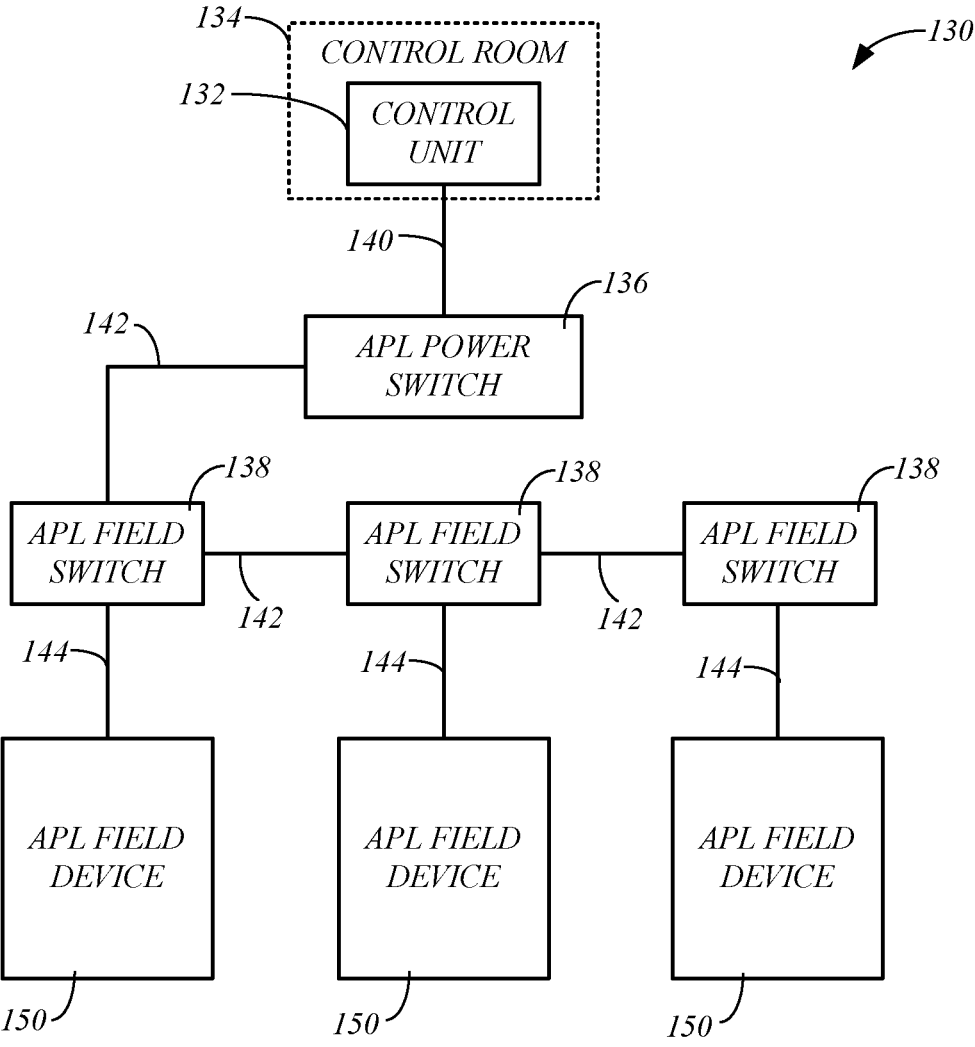
FIG. 3 is a simplified block diagram of an example of a process control or measurement system, in accordance with embodiments of the present disclosure.

FIG. 3 is a simplified block diagram of an example of a process control or measurement system 130, in accordance with embodiments of the present disclosure. The system 130 includes a control unit or host 132, which may take the form of the legacy control unit 108 described above and may be located in a control room 134. The system 130 also includes an APL power switch 136, and one or more APL field switches 138. The control unit 132 may be connected to the APL power switch 136 through ethernet wiring (e.g., standard IEEE 802.3) 140. The APL power switch 136 handles data communications and powers the APL field switches 138 through an Ethernet-APL trunk (2-wire) 142. Each of the field switches 138 may provide data communication and power for one or more APL field devices 150 over an APL spur (2-wire) 144. Each of the APL power switches 136, the APL trunks 142, the APL field switches 138, and the APL spurs 144 are formed in accordance with IEEE and IEC Ethernet-APL standards.

Figure 4:
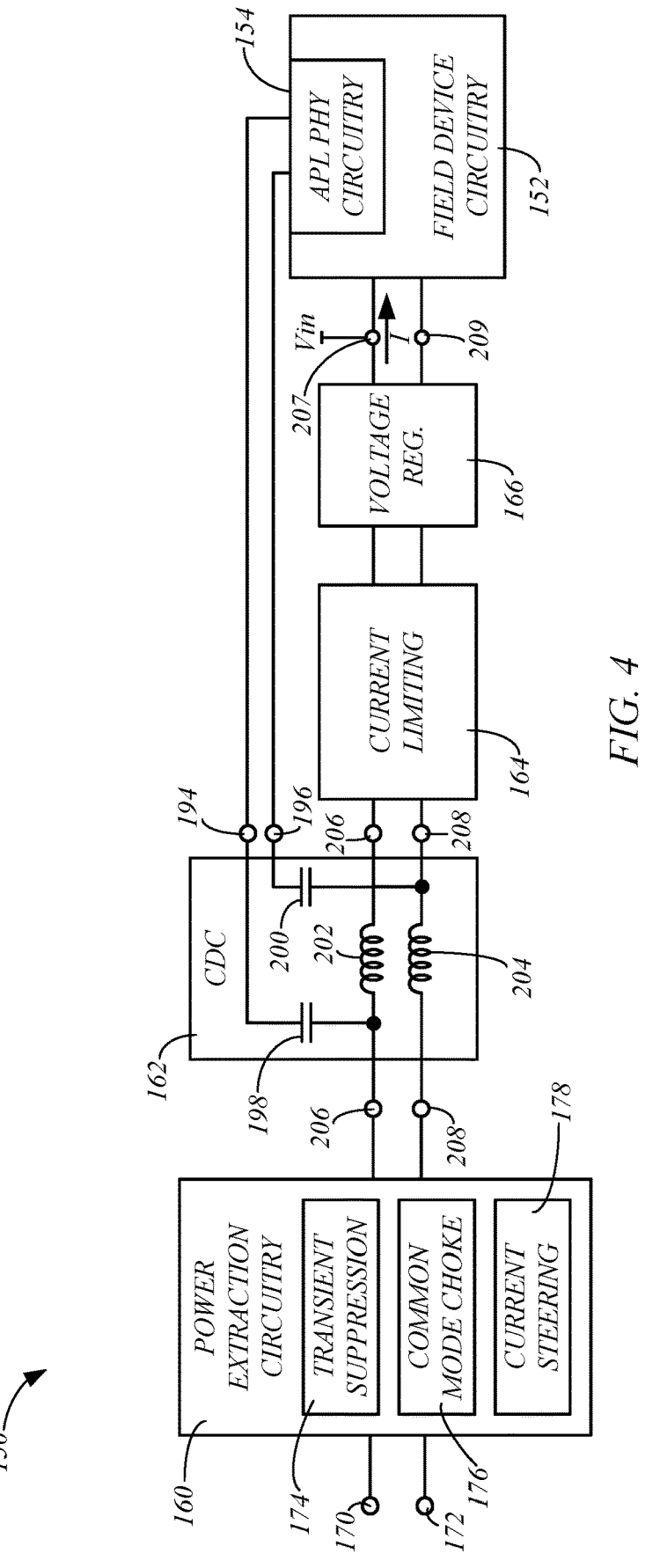
FIG. 4 is a simplified block diagram of an example of circuitry of an Advanced Physical Layer (APL) field device, in accordance with embodiments of the present disclosure.

FIG. 4 is a simplified block diagram of an example of circuitry of an APL field device 150, in accordance with embodiments of the present disclosure. The APL field device 150 includes field device circuitry 152, which represents circuitry that is used to perform conventional field device functions, such as the measurement of a process variable and the control of a control device, as discussed above with reference to FIG. 2. Thus, the field device circuitry 152 may include similar circuitry to the controller 114, the sensor or control device 116, the measurement or control circuitry 118, and/or other conventional field device circuitry.

The field device circuitry 152 also includes APL physical layer (PHY) circuitry 154, which represents circuitry that is used to communicate data over the APL spur 144 in accordance with an Ethernet protocol (e.g., 10BASE-TIL). For example, the APL PHY circuitry 152 may include a physical layer chip or circuit (e.g., the ADIN1100 integrated circuit produced by Analog Devices) and associated circuitry for enabling Ethernet communications.

If necessary, the field device circuitry 152 may include circuitry for translating data between the Ethernet protocol used by the APL PHY circuitry 154 and legacy analog (e.g., 2-wire current) signal and/or digital communication protocols (e.g., HART®, Modbus, PROFIBUS, Foundation™ Fieldbus, IO-Link, etc.) used by components of the field device circuitry 152.

In some embodiments, the APL field device 150 includes power extraction circuitry 160, a coupling and decoupling circuit (CDC) 162, a current limiting circuit 164, and/or a voltage regulator 166. The power extraction circuitry 160 includes a pair of terminals 170 and 172 that are configured to be connected to an APL spur 144 extending from an APL field switch 138 (FIG. 3). The power extraction circuitry 160 generally operates to extract power from the spur power (e.g., minimum of 500 milliwatt (mW)), which is delivered over the connected spur 144. This extracted power is used to power the circuitry of the APL field device 150 including the field device circuitry 152 and the APL PHY circuitry 154.

The power extraction circuitry 160 may include transient suppression circuitry 174, a common mode choke 176, and/or current steering circuitry 178. The transient suppression circuitry 174 operates to suppress voltage transients. The common mode choke 176 operates to suppress common mode voltage noise to a desired level and may reduce the common mode voltage between the terminals 170 and 172 to a desired voltage level. The current steering circuitry 178 directs the current of the extracted power along a desired circuit path, such as through one of the pair of terminals 179 and 180.

Figure 5:
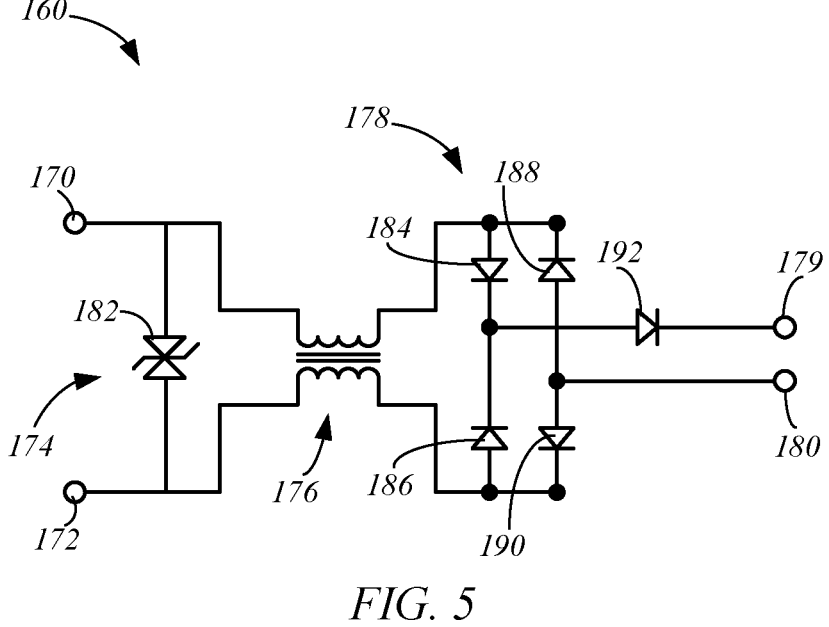
FIG. 5 is a circuit diagram of an example of power extraction circuitry, in accordance with embodiments of the present disclosure.

FIG. 5 is a circuit diagram of an example of the power extraction circuitry 160, in accordance with embodiments of the present disclosure. In this example, the transient suppression circuitry 174 includes a transient voltage suppression diode 182 connected in parallel with the terminals 170 and 172. Other suitable techniques for suppressing voltage transients may also be used.

An example of the current steering circuitry 178 includes diodes 184, 186, 188 and 190 that route the current to flow through a diode 192 and to the terminal 179, as shown in FIG. 5. Other suitable current steering techniques may also be used.

The CDC 162 is connected to the terminals 179 and 180 and to the APL PHY circuitry 154 through terminals 194 and 196, as shown in FIG. 4. Capacitors 198 and 200 of the CDC 162 allow communication signals (e.g., 10BASE-TIL signals) to pass between the APL PHY circuitry 154 and the terminals 170 and 172, while blocking direct current (DC) signals from passing through the terminals 194 and 196. The capacitors 198 and 200 may each represent two or more capacitors in series to meet intrinsic safety requirements. Thus, data may be transmitted to and from the APL PHY circuitry 154 in accordance with Ethernet-APL standards through the terminals 170 and 172.

The CDC 162 may also include inductors 202 and 204 that are connected between the terminal 179 and a terminal 206 and the terminal 180 and a terminal 208, as shown in FIG. 4. The inductors 202 and 204 operate to block communication signals (e.g., 10BASE-TIL signals) while passing DC power signals extracted from the spur 144 by the power extraction circuitry 160 for powering the circuitry of the APL field device 150.

The voltage regulator 166 receives the extracted DC power through the terminals 206 and 208, and outputs a desired DC voltage (Vin) (e.g., 12 VDC for supplying 48 mW) at terminal 207 of terminal pair 207 and 209 (circuit common voltage) for powering the field device circuitry 152, as shown in FIG. 4. The voltage regulator 166 may also be configured to output other DC voltages needed by the field device circuitry 152.

The current limiting circuit 164 operates to ensure that the APL field device 150 meets the 2-Wire Intrinsically Safe Ethernet (2-WISE) standard for operation in hazardous environments by limiting the current through the APL field device 150, such as through the terminal pairs 170 and 172, 179 and 180 and 206 and 208. The current limiting circuitry 164 may also ensure that the amplitude of the current I conducted through the field device circuitry 152 does not exceed a predetermined maximum to ensure that the safety standards for the electrical architecture of the field device circuitry 152 (e.g., 4-20 mA/HART® and Foundation™ Fieldbus circuitry) are met.

This presents a significant challenge because the intrinsic safety maximum input power or fault power of the 2-WISE standard is roughly five times higher than the power used by the circuitry of 4-20 mA HART® and Foundation™ Fieldbus circuitry that may be included in the field device circuitry 152. This is generally indicated in Tables 1 and 2, which list entity parameters for 2-WISE standard APL devices and HART® field device circuitry.

TABLE 1

| Parameter | 2-WISE Power Load Port |
|---|---|
| Maximum Input Voltage | 17.5 V |
| Maximum Input Current | 380 mA |
| Maximum Input Power | 5.32 W |
| Maximum Internal Capacitance | 5 nF |
| Maximum Internal Inductance | 10 µH |

TABLE 2

| Parameter | HART ® Field Device |
|---|---|
| Voltage | 30 V |
| Current | 200 mA |

TABLE 2-continued

| Parameter | HART ® Field Device |
|-----------|---------------------|
| Power | 0.9 W |
| Capacitance | 0.012 µF |
| Inductance | 0 µH |

For example, the 5.32 W fault power limit presents particular challenges to ensure the thermal rise of electrical components stays below specified safe levels, such as 275° C. for a T4 temperature rating, for a non-encapsulated circuit. For a non-encapsulated design, the fault power must generally be limited to ~1 W to pass the T4 rating on the multilayer printed circuit board.

Furthermore, the operating or functional current for the APL adapter is 55 mA, which is very close to the fault current if we desire the fault power limit to be 1 W (i.e., 1 W/17.5 V=57 mA). An explanation as to why this is a problem is provided below.

Traditional power limiting techniques employ power sharing resistors or a combination of current fuses and power sharing resistors. Both techniques have too poor power consumption efficiency to meet the 2-WISE entity parameters. Due to large tolerances, the current fuse nominal value has to be selected ~25% higher than the minimum current limiting value. This eliminates a current fuse only option from being used to limit the fault power to 1 W. The combination of the current fuse and power sharing resistance can limit the fault power down to 1 W, but such a configuration would have a negative impact on the device minimum operating voltage.

For example, to power limit 5.32 W to 1.27 W, the simple math provided in Equation 1 shows that an 80 mA current fuse followed by 60 Ohm power sharing resistor is needed. Note that 1.7 is a safety factor used in the intrinsic safety analysis. The 80 mA current fuse stays just above the 55 mA functional current with 25% tolerance over temperature.

$$P\_fault = [17.5\ V * 80\ mA * 1.7] -$$
$$[(80\ mA * 1.7)^2 * 60\ Ohms] = 1.27\ W.$$

Eq. 1

However, the addition of 60 Ohm resistance in series with the device input voltage adds an unacceptable 3.3 V (55 mA*60 Ohms) voltage drop.

Figure 6:
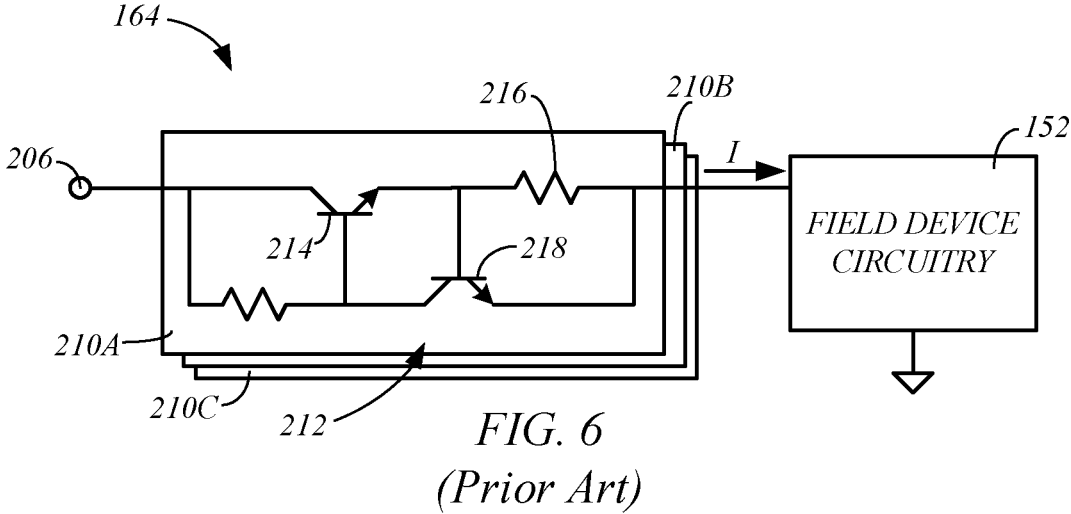
FIG. 6 is a simplified circuit diagram of a current limiting circuit connected to field device circuitry, in accordance with the prior art.

The current limiting circuit 164 may employ a series of redundant current limiters to perform its current limiting function in the APL field device 150. FIG. 6 is a simplified circuit diagram of an example of a series of redundant active current limiters 210A-C that could be used to form the circuit 164 and perform current limiting functions in the APL field device 150, in accordance with the prior art. In one example, each of the current limiters 210 include a control circuit 212 and a pass transistor 214. The control circuit 212 includes a current sensor 216, and the control circuit 212 uses feedback from the current sensor 216 (e.g., voltage across the sense resistor 216) to control the current I through the pass transistor 214.

There are two operational states for this example current limiter 210. The first state is when the voltage drop across the sense resister 216 is less than a predefined limit (~0.6 V), in which case only the pass transistor 214 conducts current. When the voltage across the sense resister 216 exceeds the predefined limit (~0.6 V), the circuit transitions to the second state, in which a transistor 218 of the control circuit 212 starts to conduct. The base current of the transistor 214 is drawn by the transistor 218 and the emitter current of the transistor 214 drops until equilibrium is reached, thereby limiting the amplitude of the current I below a desired threshold.

The example current limiter 210 of FIG. 6 and similar implementations have a limitation due to the associated voltage drop of the limiter circuits. If, for example, the current limit is 60 mA, the sense resistor 216 calculates to be ~0.6 V/60 mA=~10 Ohms. Each addition of the current limiter circuit 210 needed to satisfy a redundancy requirement will add 55 mA (functional input current)*10 Ohms or a 0.5 V drop to the input voltage at terminal 206 which could be deemed unacceptable for power constraint designs. Moreover, when the current limit is activated (i.e., second state), the associated voltage drop, which consists of the voltage across the transistor 214 ($V_{CE,\ SAT}$) of ~1 V and the voltage across the sense resistor 216 of ~0.6 V for each current limiter circuit 210 could be of a concern. An additional drawback is that the base-emitter voltage (~0.6 V) has poor accuracy due to its variation against the collector current and ambient temperature.

Embodiments of present disclosure include a current limiting circuit 164 that solves these issues and provides a 2-WISE fault power limiting solution that is power efficient and provides cost comparable to the traditional techniques like power sharing resistors and current fuses. In one embodiment, the current limiting circuit 164 includes multiple stages forming a redundant series of current limiting circuits. This provides intrinsic safety APL power limiting (down to ~1 W) that is acceptable for conventional 4-20 mA and HART® and Foundation™ Fieldbus circuitry 152. In one embodiment, the voltage drop across the stages or between the terminals 206 and 207 is made substantially negligible.

Figure 7:
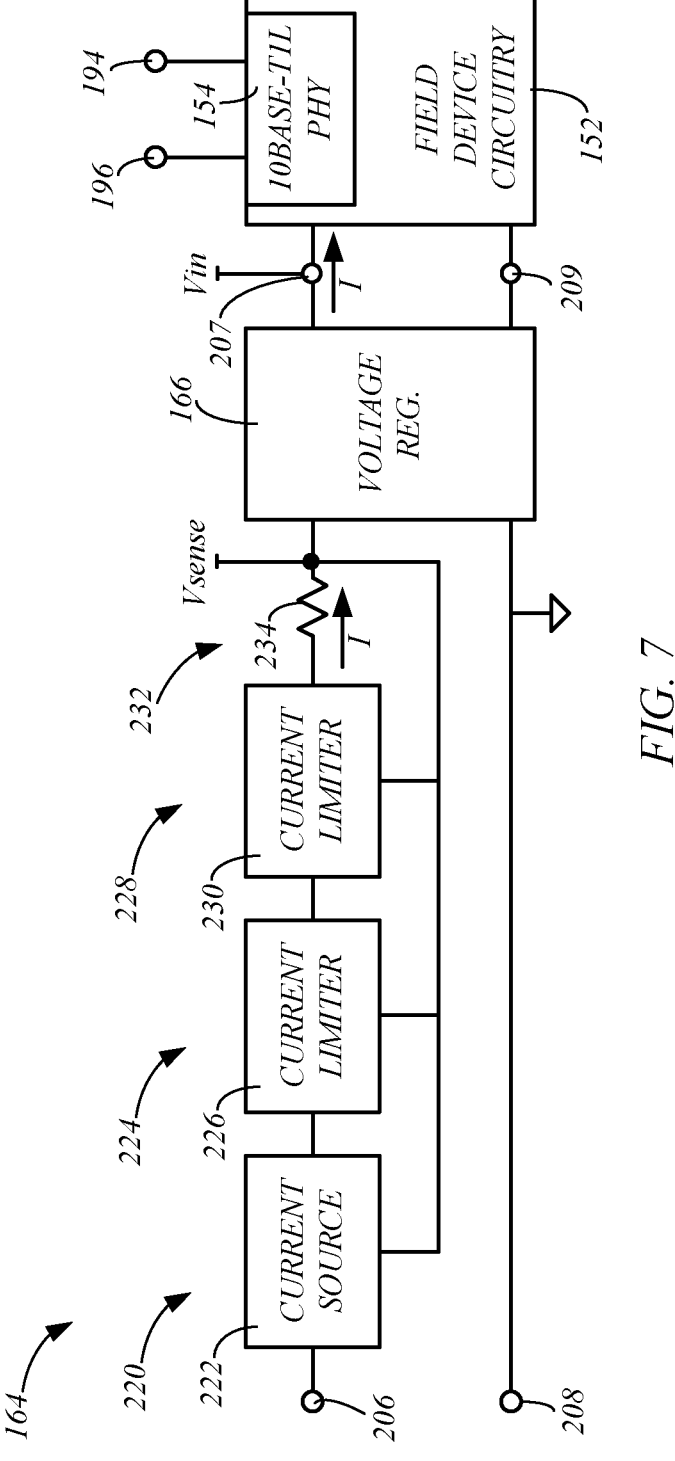
FIG. 7 is a simplified circuit diagram of circuitry of an APL field device including a current limiting circuit connected to field device circuitry, in accordance with embodiments of the present disclosure.

In one example, the current limiting circuit 164 includes a first stage 220 having a current source 222, a second stage 224 that includes a current limiter 226, and a third stage 228 that includes a current limiter 230, as shown in the simplified circuit diagram of FIG. 7. A current sensor 232 may be used to provide feedback to the current source 222, the current limiter 226 and the current limiter 230 that is proportional to the amplitude of the source current I supplied to the field device circuitry 152. In one example, the current sensor 232 includes a single sense resistor 234 that produces the feedback in the form of a voltage (Vsense) that is proportional to the source current I for all three stages 220, 224 and 228.

The current source 222 is configured to source the current I such that it has an amplitude that is at a current source threshold. The current limiter 226 is configured to limit the amplitude of the source current below a first limiter threshold, and the current limiter 230 is configured to limit the amplitude of the source current below a second limiter threshold. For example, the stages 220, 224 and 228 may limit the source current I from, for example, 380 mA to 60 mA, to reduce the fault power to ~1 W (P_fault=17.5V*60 mA=1.05 W) and meet the desired fault power limit for the field device circuitry 152 of a non-encapsulated field device 150 with a T4 rating.

The current limiting circuit 164 may configure the current source threshold, the first limiter threshold and the second limiter threshold to have different relationships. For example, either the first limiter threshold or the second limiter threshold may be greater than the current source threshold, each of the thresholds may match, the first limiter threshold and the second limiter threshold may be equal and different from the current source threshold, or the thresholds may have another suitable relationship.

In one embodiment, the current source threshold is less than the first limiter threshold and the second limiter threshold. In one example, the source current threshold is set to 55 mA, and the first and second limiter thresholds are each set to 60 mA. This has the effect of reducing the voltage drop across the stages 220, 224 and 228 and maximizing power efficiency.

Figure 8:
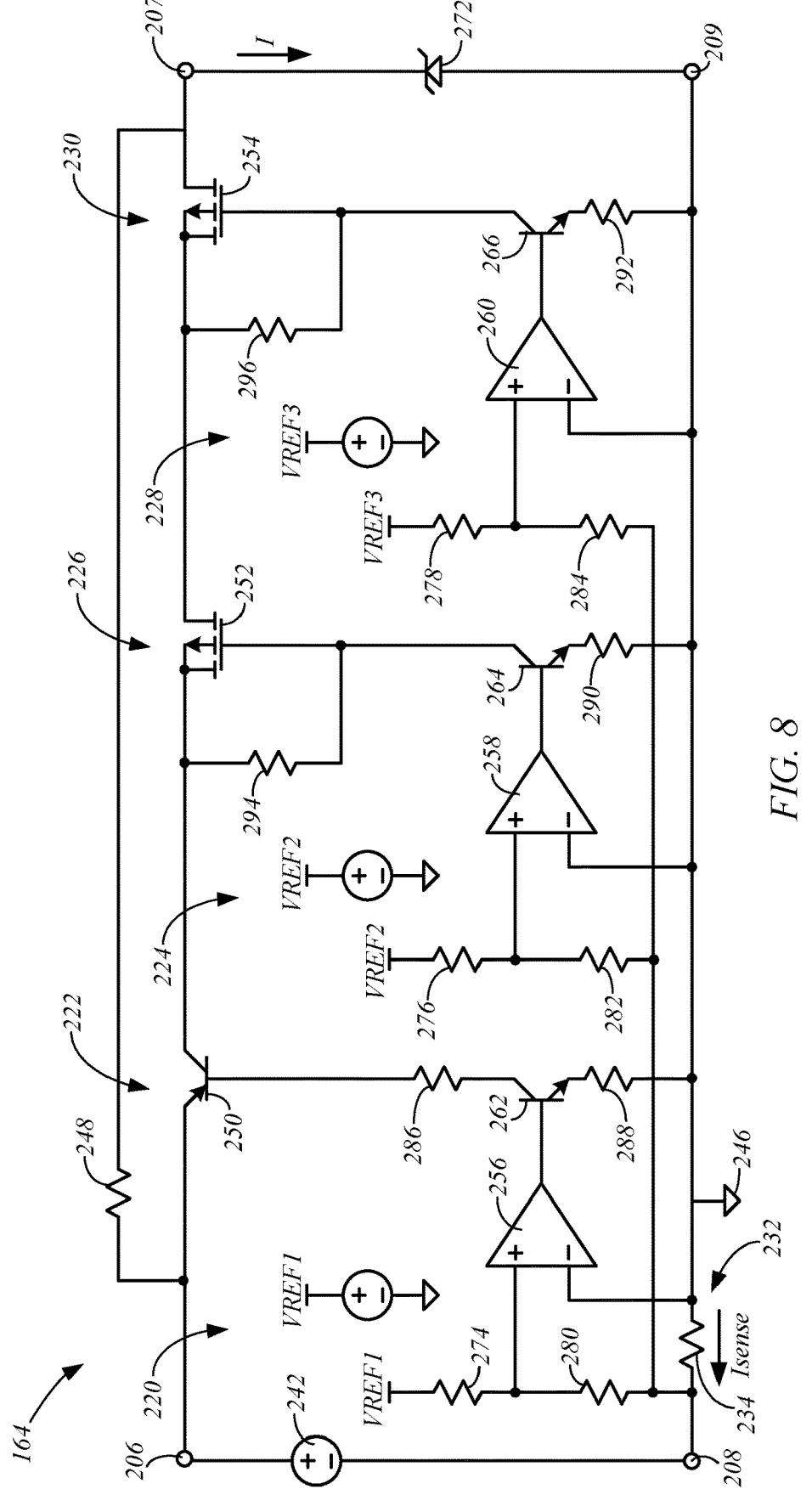
FIG. 8 is a circuit diagram of an example of a current limiting circuit, in accordance with embodiments of the present disclosure.

An example of the configuration of the current limiting circuit 164 of FIG. 7 is provided in the simplified circuit diagram of FIG. 8, in which the voltage regulator 166 is simplified by a Zener diode 272. The depicted circuit 164 is 2-WISE and IEC 60079-11 compliance ready and minimizes voltage drops across the stages 220, 224 and 228 for maximum power efficiency. The circuit 164 may be configured with conventional circuit components for managing noise, startup, stability, etc. Such components are not shown in order to simplify the drawing and the corresponding discussion. The following discussion of the circuit is largely from a DC bias perspective unless otherwise noted.

In one embodiment, the current source 222 of the first stage 220 generates the current I having an amplitude that is at a current source threshold of 55 mA in accordance with an APL functional requirement for an input voltage of 9.5 VDC from the power extraction circuit 160 at terminal 206, which is represented by a voltage source 242. The current limiter 226 of the second stage 224 may limit the input current I provided by the current source 222 to a first limiter threshold of 60 mA in the event of a first stage failure. The current limiter 230 of the third stage 228 may be identical to the current limiter 226 and limit the current I provided by the current limiter 226 to a second limiter threshold of 60 mA in the event of a second stage failure. Thus, as mentioned above, the trip points of the current limiters 226 and 230 may be set slightly higher than the setpoint of the current source 222. As discussed below, this results in a negligible voltage drop across the limiters 226 and 230 in normal operation. Together, the three stages 220, 224 and 228 satisfy the redundancy requirement of the IEC 60079-11 standard with each stage being independent from the others during a fault analysis.

A single sense resistor 234 (e.g., 5 Ohms) may be used for all three stages 220, 224 and 228 as the current sensor 232 and is located in the return current path between field device circuit common 246 and the negative terminal 180. This minimizes the series voltage drop from stage to stage and maximizes power efficiency.

Resistor 248 may be used for circuit startup before transistors 250 and enhancement mode MOSFETs 252 and 254 are controlled by their respective op amps 256, 258 and 260 and transistors 262, 264 and 266. The Zener diode 272 is used to represent the voltage regulator 166 providing Vin voltage (~9V) at the terminal or node 207.

In one example, the voltage source 242 may provide 9.5 VDC, reference voltages VREF1, VREF2 and VREF3 may each be 1.2 VDC, resister 274 may be 100.4 kOhms, resistors 276 and 278 may be 92 kOhms, resistors 280, 282 and 284 may be 23 kOhms, resistor 286 may be 3 kOhms, resister 288 may be 5 kOhms, resistors 290 and 292 may be 10 kOhms, resistors 294 and 296 may be 300 kOhms, and resistor 258 may be 20 kOhms.

During normal operation when no fault is present, the first stage op amp 256 is in control to regulate 55 mA current I through the transistor 260. The current source DC transfer function is Isense=VREF1*R280/(R274*R228). During this time, the MOSFETs 252 and 254 are biased in the saturation region with negligible drain-to-source resistance. All three stages 220, 224 and 228 operate in the power efficient manner with the voltage drop between the applied voltage at the terminal 206 from the voltage source 242 and Vin at the terminal 207 consisting of voltage drop across the sense resistor 234 (55 mA*5 Ohms=0.275 V) and emitter-collector voltage drop (VCE) across transistor 250 (~0.2V). Note, the VCE drop of transistor 250 is the same compared to the generic circuit in FIG. 6. However, the dependence of the sense resistor 234 on base-emitter voltage drop (VBE) of the transistor 250 is removed, which improves the power efficiency and accuracy of the circuit 164 of FIG. 8.

When a fault of the first stage 220 occurs through a short from the emitter to the collector of transistor 250, the output from the op amp 256 saturates and the current limiter 226 of the second stage 224 takes over the current regulation control. Likewise, in the event of a fault of the second stage 224, the current limiter 230 of the third stage 228 would take over current regulation control. Thus, the current I may be slightly higher under a fault condition than that under non-fault conditions where the current is controlled by the current source 222 of the first stage 220. This configuration results in a negligible voltage drop across the stages 220, 224 and 228 during normal operation.

Although the embodiments of the present disclosure have been described with reference to preferred embodiments, workers skilled in the art will recognize that changes may be made in form and detail without departing from the spirit and scope of the present disclosure.

What is claimed is:

1. A current limiting circuit for limiting a current through a pair of terminals powered from a 2-wire Advanced Physical Layer (APL) spur, the current limiting circuit comprising:

a current source connected to one of the terminals and configured to source a current conducted through the terminals having an amplitude that is at a current source threshold;

a first current limiter connected to the current source and configured to limit the amplitude below a first threshold; and a second current limiter connected to the first current limiter and configured to limit the amplitude below a second threshold, wherein:

the current source includes a pass transistor through which the current travels;

the current travels through first and second terminals of the pass transistor; and the amplitude of the current is based on a voltage at a third terminal of the pass transistor, which is disconnected from the first and second terminals.

2. The current limiting circuit of claim 1, wherein the first and second thresholds are greater than the current source threshold.

3. The current limiting circuit of claim 1, further comprising a current sensor configured to output a feedback signal that is indicative of the amplitude to the current source, the first current limiter and the second current limiter.

4. The current limiting circuit of claim 3, wherein the current sensor comprises a sense resistor and the feedback signal comprises a voltage.

5. The current limiting circuit of claim 3, wherein:

the current source includes a control circuit;

the first current limiter and the second current limiter each comprise:

a control circuit; and a pass transistor, having first, second and third terminals, wherein:

the current travels through the first and second terminals; and the amplitude of the current is based on a voltage at the third terminal, which is connected to the first terminal through a resistor; and each control circuit uses the feedback signal to control the voltage at the third terminal, which controls the passage of the current through the corresponding pass transistor.

6. A field device for an industrial process comprising:

a pair of terminals configured to receive power from a 2-wire Advanced Physical Layer (APL) spur;

a current limiting circuit configured to limit a current through the terminals comprising:

a current source connected to one of the terminals and configured to source a current conducted through the terminals having an amplitude that is at a current source threshold;

a first current limiter connected to the current source and configured to limit the amplitude below a first threshold; and a second current limiter connected to the first current limiter and configured to receive the current from the first current limiter and limit the amplitude below a second threshold; and field device circuitry connected to the second current limiter and powered using the current, wherein:

the current source includes a pass transistor through which the current travels; and an emitter of the pass transistor is disconnected from a base of the transistor.

7. The field device of claim 6, wherein the field device circuitry comprises an active component selected from the group consisting of a sensor configured to sense a process parameter, and a control device configured to control a process of the industrial process.

8. The field device of claim 7, including APL PHY circuitry configured to communicate through the pair of terminals in accordance with an Ethernet protocol.

9. The field device of claim 6, wherein the first and second thresholds are greater than the current source threshold.

10. The field device of claim 6, wherein the current limiting circuit comprises a current sensor configured to output a feedback signal that is indicative of the amplitude to the current source, the first current limiter and the second current limiter.

11. The field device of claim 10, wherein the current sensor comprises a sense resistor and the feedback signal comprises a voltage.

12. The field device of claim 10, wherein;

the current source includes a control circuit;

the first current limiter and the second current limiter each comprise:

a control circuit; and a pass transistor, having first, second and third terminals, wherein:

the current travels through the first and second terminals; and the amplitude of the current is based on a voltage at the third terminal, which is connected to the first terminal through a resistor; and each control circuit uses the feedback signal to control the voltage at the third terminal, which controls the passage of the current through the corresponding pass transistor.

13. A method of controlling a current in a field device, which includes a pair of terminals, field device circuitry and a current limiting circuit that includes a current source connected to one of the terminals, a first current limiter connected to the current source, and a second current limiter connected to the first current limiter and the field device circuitry, the method comprising:

receiving power from a 2-wire Advanced Physical Layer (APL) spur at the pair of terminals;

sourcing a current conducted through the terminals using the current source, which limits an amplitude of the current to a current source threshold;

receiving the current from the current source at the first current limiter;

limiting the amplitude of the current below a first threshold using the first current limiter;

receiving the current from the first current limiter at the second current limiter;

limiting the amplitude of the current below a second threshold using the second current limiter; and powering field device circuitry using the current, wherein:

the current source includes a pass transistor through which the current travels;

the current travels through first and second terminals of the pass transistor; and the amplitude of the current is based on a voltage at a third terminal of the pass transistor, which is disconnected from the first and second terminals.

14. The method of claim 13, wherein the first and second thresholds are greater than the current source threshold.

15. The method of claim 13, further comprising:

generating a feedback signal that is indicative of the amplitude using a current sensor; and controlling the current source, the first current limiter and the second current limiter using the feedback signal.

16. The method of claim 15, wherein the current sensor comprises a sense resistor and the feedback signal comprises a voltage.

17. The method of claim 15, wherein:

the current source includes a control circuit;

the first current limiter and the second current limiter each comprise:

a control circuit; and a pass transistor, having first, second and third terminals, wherein:

the current travels through the first and second terminals; and the amplitude of the current is based on a voltage at the third terminal, which is connected to the first terminal through a resistor; and each control circuit uses the feedback signal to control the voltage at the third terminal, which controls the passage of the current through the corresponding pass transistor.

18. The method of claim 13, wherein the field device circuitry comprises an active component selected from the group consisting of a sensor configured to sense a process parameter, and a control device configured to control a process of the industrial process, and APL PHY circuitry configured to communicate through the pair of terminals in accordance with an Ethernet protocol.

\* \* \* \* \*